(12) United States Patent
Endo et al.

(10) Patent No.: US 8,061,470 B2
(45) Date of Patent: Nov. 22, 2011

(54) METHOD AND APPARATUS FOR DEPLOYING A PLURALITY OF SEISMIC DEVICES INTO A BOREHOLE AND METHOD THEREOF

(75) Inventors: Tatsuki Endo, Sagamihara (JP); Gbenga Onadeko, Sugar Land, TX (US); Masafumi Fukuhara, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 65 days.

(21) Appl. No.: 12/146,424

(22) Filed: Jun. 25, 2008

(65) Prior Publication Data

US 2009/0321174 A1    Dec. 31, 2009

(51) Int. Cl.
*G01V 1/40* (2006.01)
*G01V 1/42* (2006.01)
*G01V 1/00* (2006.01)
*G01V 1/09* (2006.01)

(52) U.S. Cl. ........................ 181/102; 181/114
(58) Field of Classification Search .................. 181/102, 181/114, 105, 106, 122, 112; 367/20, 177
See application file for complete search history.

(56) References Cited

U.S. PATENT DOCUMENTS

| | | | | |
|---|---|---|---|---|
| 3,921,755 A | * | 11/1975 | Thigpen | 181/122 |
| 3,923,121 A | * | 12/1975 | Kruppenbach et al. | 181/112 |
| 4,293,933 A | * | 10/1981 | Park et al. | 367/25 |
| 4,686,653 A | * | 8/1987 | Staron et al. | 340/856.2 |
| 4,898,237 A | * | 2/1990 | Wittrisch | 340/856.2 |
| 4,920,680 A | * | 5/1990 | Lindgren | 43/4.5 |
| 5,044,460 A | * | 9/1991 | Kamata et al. | 181/102 |
| H1232 H | * | 9/1993 | DiSiena | 367/57 |
| 5,475,187 A | * | 12/1995 | Omnes | 181/102 |
| 5,810,080 A | * | 9/1998 | Meynier | 166/66 |
| 5,892,733 A | * | 4/1999 | Havig | 367/188 |
| 5,959,939 A | * | 9/1999 | Tengham et al. | 367/174 |
| 6,006,855 A | * | 12/1999 | Howlett | 181/102 |
| 6,024,344 A | * | 2/2000 | Buckley et al. | 367/76 |
| 6,076,629 A | * | 6/2000 | Tengham | 181/102 |
| 6,630,890 B1 | * | 10/2003 | Endo et al. | 340/853.9 |
| 6,775,203 B2 | * | 8/2004 | Fagerås et al. | 367/16 |
| 7,048,089 B2 | * | 5/2006 | West et al. | 181/105 |
| 7,163,065 B2 | * | 1/2007 | Zhang et al. | 166/385 |
| 7,310,287 B2 | * | 12/2007 | Ray et al. | 367/188 |
| 2006/0209633 A1 | * | 9/2006 | George et al. | 367/20 |
| 2008/0066961 A1 | * | 3/2008 | Aivalis et al. | 175/50 |
| 2010/0054078 A1 | * | 3/2010 | Thompson et al. | 367/20 |
| 2010/0054079 A1 | * | 3/2010 | Thompson et al. | 367/20 |

* cited by examiner

*Primary Examiner* — Edgardo San Martin
(74) *Attorney, Agent, or Firm* — Daryl R. Wright; Jody DeStefanis; Jeff Griffin

(57) ABSTRACT

Deploying systems and methods for deploying a plurality of seismic devices into a borehole comprising a cable including a plurality of inter-connected cable segments and ellipsoid seismic units with at least two rows of offset seismic protrusions to establish at least three points of contact between the seismic units and adjacent cylindrical surface of a borehole casing.

10 Claims, 4 Drawing Sheets

METHOD AND APPARATUS FOR DEPLOYING A PLURALITY OF SEISMIC DEVICES INTO A BOREHOLE AND METHOD THEREOF

TECHNICAL FIELD

This invention relates to an apparatus and method for deploying a plurality of sensor devices into a borehole, and more particularly to an apparatus for deploying a seismic device array having a cable comprising a plurality of connectable cable segments or devices.

BACKGROUND OF THE INVENTION

In the oil and gas industry, acoustic tools are used to provide operationally significant information about seismic events occurring during production of a well. Borehole seismic data can be utilized to determine subsurface stratigraphy and refine surface seismic data. Micro-seismic data may be generated by formation fracturing—induced or natural. The acoustic tools may include seismic sensors such as geophones, geophone accelerometers, hydrophones, or other types of sensors known in the art.

In the past, downhole seismic data has been acquired by a number of different techniques. An array of seismic devices having seismic sensors may be deployed into a borehole, and when the seismic devices reach a desired depth, they may be mechanically coupled to a borehole wall, casing and/or be cemented in place. In other instances, seismic tools with sensors may be coupled to production tubing, inside a well, or in association with production packers.

A conventional method for deploying a seismic device in a borehole may utilize a winch mechanism. The winch mechanism may include a winch drum and a cable, which may be a wireline and is wound around the drum. A plurality of seismic devices are attached to the cable spaced apart from each other. The drum is rotatably supported on the winch and, as the drum rotates counterclockwise, the cable unwinds from the drum and descends into the borehole with the sensors.

Conventional methods have encountered many problems. For example, the seismic devices may be attached to the cable by means of an electrical mechanism and a mechanical mechanism, and thus form large and less flexible nodes on the cable. When such a seismic array is wound onto a winch drum, the nodes may form numerous bulges. Thus, the seismic array may not be uniformly wound onto the winch drum, which may lead to inefficient use of space and potential entanglement of the cable and nodes. Although a triangle drum has been considered by people having ordinary skill in the art for deploying a seismic device array with large-sized sensors, such as a VSI (Versatile Seismic Imager), this kind of drum has a limitation on the number of layers of the array around the drum and hence the length of the array. Further, in conventional methods, a large-sized drum may be needed for an array having a large number of seismic devices and will take up a large space near a rig, which is not desirable.

There are also other conventional methods for deploying an array having a plurality of seismic devices into a borehole without using a winch drum, such as deploying seismic devices one by one into the borehole. Such methods, however, are time-consuming and it may take, for example, 5 to 10 minutes per node or shuttle, to deploy such an array into a borehole.

SUMMARY

One embodiment of the subject disclosure provides a seismic sensor for deployment into a borehole that includes a housing, a plurality of seismic sensors, and a first and second row of protrusions. The housing has at least one circulated exterior surface and the plurality of seismic sensors are at least partially positioned within the interior of the housing. The first and second row of protrusions are circumferentially spaced and offset and have a projection dimension such that when the seismic sensor is placed within the borehole and brought into a engagement with an interior surface of the borehole, at least three of the protrusions abut against the interior surface of the borehole.

Another embodiment of the subject disclosure provides for deploying at least one seismic device into a borehole. The deployment includes winding a cable comprising a plurality of inter-connectable segments onto a rotatable drum, unwinding the cable from the rotatable drum and directing the cable to the borehole, at a predetermined point, detaching a cable segment from the cable before the cable segment descends into the borehole, and attaching an ellipsoid seismic device between the detached cable segment and an adjacent cable segment.

Another embodiment of the subject disclosure provides a method for deploying a plurality of seismic devices into a borehole. The deployment includes winding a cable onto a rotatable drum, unwinding the cable from the rotatable drum and directing the cable to the borehole, at a predetermined point, attaching a seismic device onto the cable before the cable descends into the borehole, and lowering the seismic device into the borehole.

Another embodiment of the subject disclosure provides a method for deploying a plurality of seismic devices into a borehole. The deployment includes winding a cable comprising a plurality of inter-connectable segments onto a rotatable drum, unwinding the cable from the rotatable drum and directing the cable to a borehole casing, at a predetermined point, detaching a cable segment from the cable before the cable segment descends into a borehole, positioning three orthogonal seismic sensors within the seismic device, providing a plurality of protrusions in two rows on a center portion of an outside surface of the ellipsoid seismic sensor, and attaching the seismic device between the detached cable segment and an adjacent cable segment; wherein any three adjacent protrusions not in a same row of the plurality of protrusions form a triangle for contact with an internal wall surface of the cylindrical casing.

DRAWINGS

Other aspects of the present invention will become apparent from the following detailed description of embodiments taken in conjunction with the accompanying drawings wherein.

DETAILED DESCRIPTION

Turning now to the drawings, wherein like numerals indicate like parts, the subject invention is directed to the concept of an apparatus and a method for deploying a plurality of seismic devices into a borehole.

Figure 1:
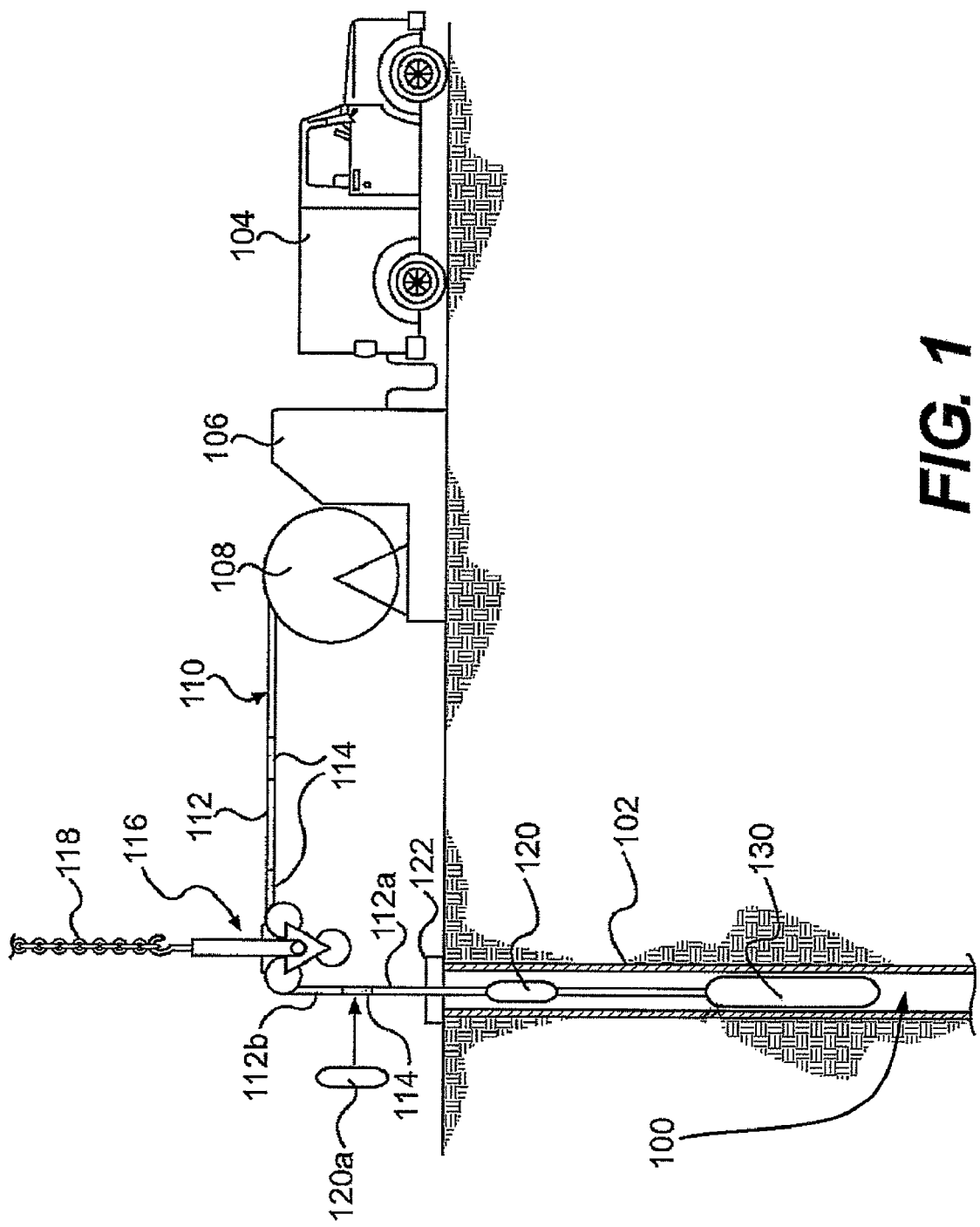
FIG. 1 is a schematic view of a deploying system for deploying a plurality of seismic devices into a borehole according to an embodiment of the invention.

FIG. 1 illustrates a deploying system for deploying a seismic device array into a bore hole according to an embodiment of the present invention. As shown in the figure, the borehole 100 extends into the earth from a ground surface and well casing 120 is fitted into the borehole to define a cylindrical wall surface. Although the present disclosure is applicable to open hole as well, for clarity and completeness the following description will be given in context of using a cased well. An exploration vehicle 104 carries thereon a measurement control unit (not shown) and is parked close to the mouth of the borehole 100. A winch 106 is located adjacent to the vehicle 104 and the winch 106 has a winch drum 108. A cable 110 is wound around the drum. This cable may be a standard wireline cable or fiber optic cable well-known in the art. As is known to those of skill in the art, some of the hardware may change depending on the location of the job, such as during off-shore explorations, for example.

The cable 110 may be made up of a single cable unit over its total length, or may comprise multiple inter-connectable cable segments 112. The length of a cable segment 112 may be variable as needed. Each cable segment 112 has one end equipped with an electrical outlet and the other end equipped with an electrical inlet (not shown). The electrical outlet and inlet may be a wet connector type or an induction coupling type. Each cable segment may comprise a mechanical connection mechanism (not shown) at each end to connect to another cable segment. The mechanical connection mechanism can release the cable segment as needed. When the cable segments 112 are connected, the mechanical connection mechanisms and the electrical outlets and inlets form a plurality of connection units 114.

The winch drum 108 is rotatably supported on the winch 106, and, as the drum 108 rotates counterclockwise, the cable 110 is unwound from the drum and descends into the borehole 100 via a three-pulley guide assembly 116 which may be suspended in position by means of chain 118.

According to embodiments of the present invention, the electrical outlets, inlets and the mechanical connection mechanisms of each cable segment have a small size such that when the cable segments 112 are connected, the connection unit 114 has a small diameter and a short length. Thus, the whole cable 110 which may be made up of the connected cable segments 112 that can be wound onto the drum 108 without incurring excessive bulges. Accordingly, a relatively long cable can be wound uniformly onto the drum 108.

According to embodiments of the present invention, when not in use, a cable of a certain length, which depends on need, is wound onto the drum with no sensors attached. When in use, that is, when one or more well logging tool 120 need to be lowered into a borehole 100, the drum 108 is used to unwind the cable 110. Before a cable segment 112 is lowered into the borehole via the guide assembly 116, it may be detached from the cable 110 and a seismic device 120 is attached between the cable segment and its adjacent cable segment. For example, a cable segment 112a, may be detached from its adjacent cable segment 112b on one end before it descends into the borehole. A seismic device 120a may be electrically attached between the cable segments 112a and 112b through the electrical outlet, inlet and the mechanical connection mechanism of the cable segments. The length of the cable 110 may be changed as needed.

Alternatively, the cable 110 may be at least a substantially single unitary piece, such that a connection between segment is not needed. In this embodiment, the devices 120 are placed into the cable 110 without having to connect or disconnect any cable segments. As such, the cable 110 may be continually wound or unwound while the devices 120 are being removed or placed in the cable 110. This configurations would allow a smooth and bulge less rolling of the cable 110 and would significantly decrease the deployment and retrieval time of the sensor array.

According to embodiments of the present invention, the cable 110 may be further connected to a transmitter, a telemetry electrical sub, or to another cable. In one embodiment of the present invention, a weight 130 may be fixed to one end of the cable 110 to apply a pulling force to the cable, and thus assist in establishing engagement of the seismic devices 120 with the casing 102 of the borehole. In another embodiment of the present invention, a coupling mechanism (not shown) may be used to fix one end of the cable to the casing 102 of the borehole 100.

Figure 2:
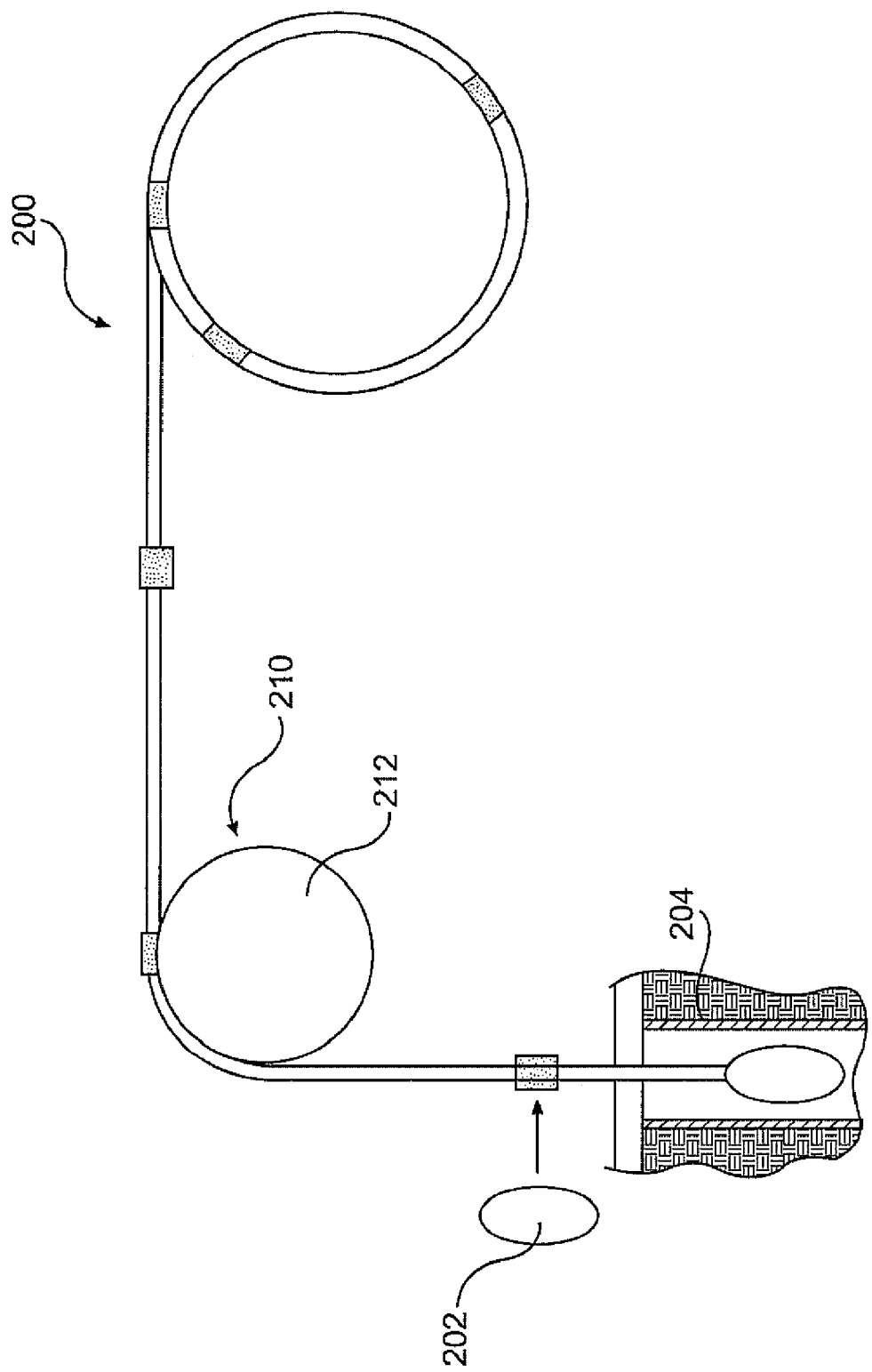
FIG. 2 is a schematic view of a deploying system for deploying a plurality of seismic devices into a borehole according to another embodiment of the invention.

FIG. 2 illustrates a deploying system 200, which is similar to the system depicted in FIG. 1, for deploying a plurality of seismic devices 202 into a borehole 204 according to another embodiment of the present invention. The main difference is that a guide assembly 210 may be a sheave wheel 212 and the seismic device 202 may be an ellipsoid in the deploying system shown in FIG. 2, whereas in the deploying system shown in FIG. 1, the guide assembly is a three-pulley guide assembly 116 and the seismic device 120 may be cylinder-shaped.

Regardless of the method of deployment or the deployment system utilized, both the cylinder-shaped and ellipsoid shaped devices 120 may be utilized. Furthermore, the inventive systems disclosed herein may be utilized with other shaped devices and other types of sensors known to those in the art. For example, the devices 120 may be include rectangular, spherical, square, combinations thereof, or other odd shapes, and the sensors may include resistivity, seismic, pressure, temperature, chemical, nuclear and other contemplated sensors.

Figure 3B:
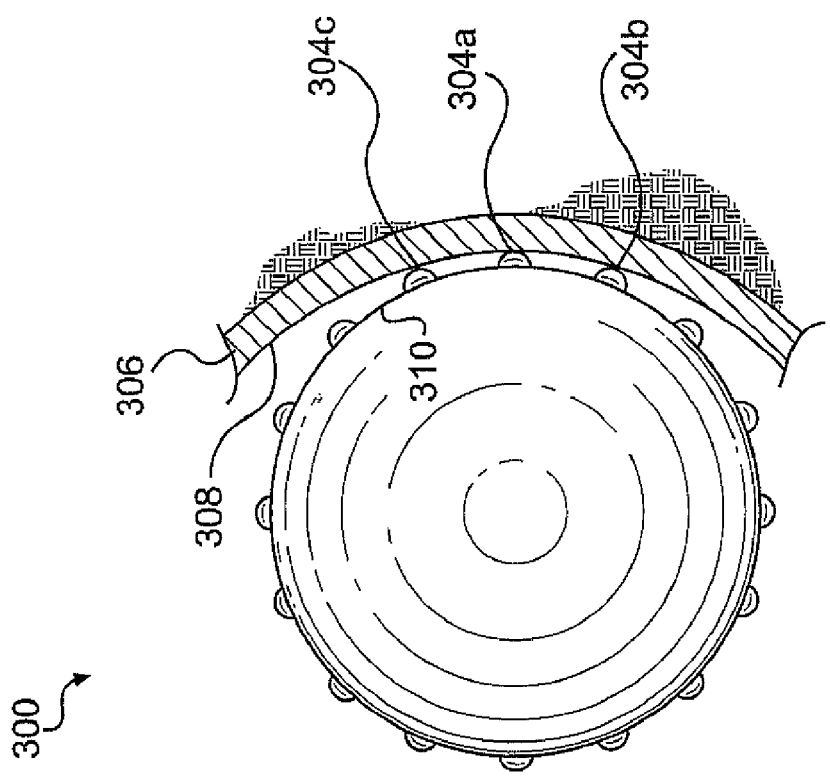
FIGS. 3A and 3B illustrate a seismic device according to another embodiment of the invention.
Figure 3A:
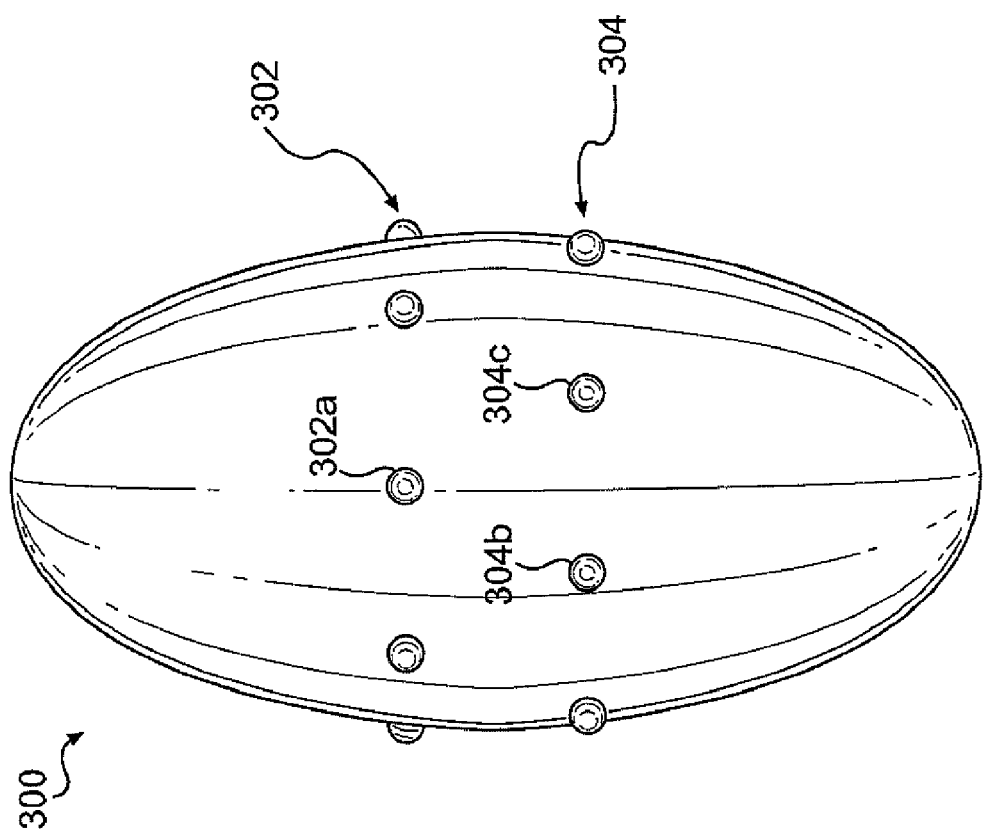

FIGS. 3A and 3B illustrate a seismic device 300 according to an embodiment of the present invention. The shape of the seismic device 300 may be defined as ellipsoid having no angles or edges that may cause the device to hang-up or catch on the borehole wall or casing during entry or exit from the borehole. Furthermore, the ellipsoid shape may reduce the effects of a tube wave impact. For example, during acoustic activity one or more waves may travel along the length of the borehole, creating an impact with the structures (tools, sensors, devices, etc.) in its path. The ellipsoid shape may, thus, mitigate the impact of the wave as it comes upon the device. The shape of the seismic device 300 is also not limited to ellipsoid, but may include other similar shapes contemplated in the present disclosure.

This type of seismic device may be used with the deploying systems depicted in FIG. 1 or 2. As known in the art, when the seismic devices 202 reach a desired depth in a borehole, they must be acoustically coupled to a wall of the borehole or casing in order to record seismic signals. A good coupling between a seismic device and a borehole wall requires that the seismic device motion is consistent with the particle motion of the borehole wall within the frequencies of interest, which is usually a few Hz to 100 Hz for VSP, but could be up to a few KHz depending on the survey purpose and the type of the sensor. Therefore, a stable contact between the wall of a borehole and a seismic device is critical. As is also known in the art, three points are sufficient to establish a stable contact. As shown in FIG. 3A, around the middle portion of the outside surface of the ellipsoid sensor 300, two rows of protrusions 302 and 304 are formed in a staggered but uniformly spaced around circumference of the ellipsoid sensor as shown in the top view FIG. 3B. For example, when the seismic ellipsoid 300 abuts against an interior wall surface of a casing 306, in the FIG. 3B, the curvature 308 of the casing wall 306 conjoined with the curvature 308 of the seismic device 300 and the height of the protrusions 302 and 304 introduce at least three points of contact such as 302a, 304b and 304c are engaged with the casing wall 306.

Another factor that may affect coupling is the coupling force. As a general rule of thumb, the lateral force applied to the sensor for coupling is 10:1 to the weight of the sensor. The heavier the sensor, the larger the coupling force needed. The seismic device 300 will have three orthogonal seismic sensors, which may be geophones or geophone accelerometers, a shaker, and small-sized electronics, such as a pre-amplifier and an analog to digital converter. The seismic device 300 may comprise a mechanical connection mechanism that has a relatively simple structure. Thus, the seismic device may have a light weight and a small size.

Figure 4B:
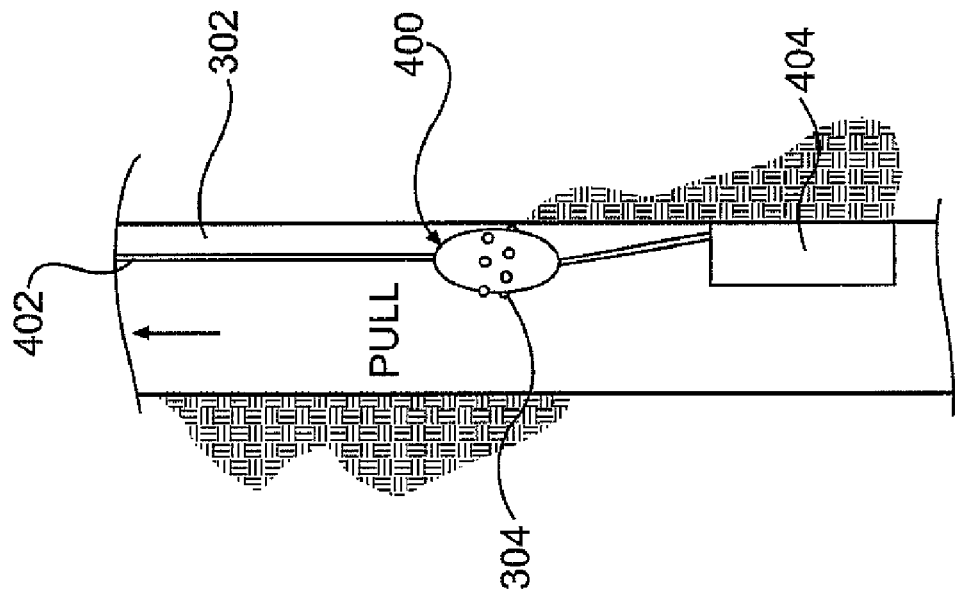
FIGS. 4A and 4B illustrate a method of coupling seismic devices depicted in FIGS. 3A and 3B to a borehole wall according to another embodiment of the subject invention.
Figure 4A:
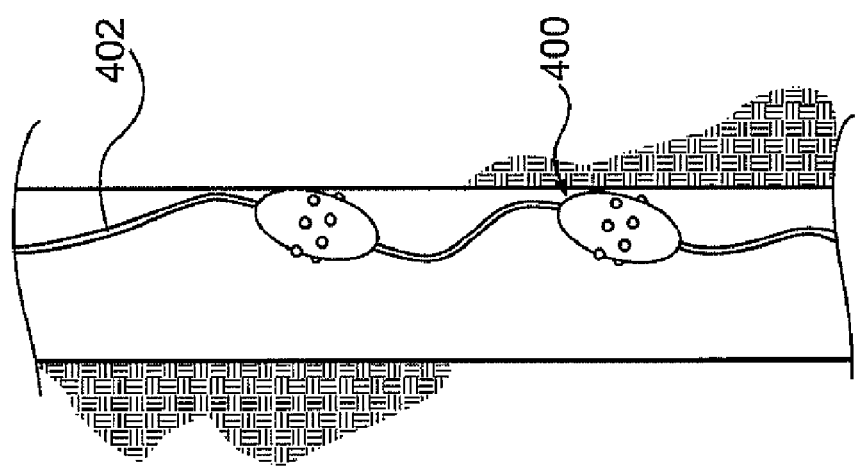

According to an embodiment of the present invention, as shown in FIGS. 4A and 4B, the seismic devices 400, which may be similar to the seismic devices 300 depicted in FIGS. 3A and 3B, are attached to a cable 402, which may be similar to the cable 110 depicted in FIGS. 1 and 2. A coupling mechanism 404 may be fixed to one end of the cable 402 and couple the end of the cable 402 to the wall of a borehole casing. When tension is applied to the cable, the cable 410 is pulled up and will be stretched from an original relaxed condition as shown in FIG. 4A to a tangent state as depicted in FIG. 4B. Therefore, a lateral coupling force may be produced and the seismic device 400 is brought into contact with the wall of the borehole casing. Since the ellipsoid seismic device 400 has two rows of protrusions 302 and 304 forming continuous triangles at a center portion of the sensor, the sensor will have three points in contact with the wall of the borehole casing. Meanwhile, since the seismic devices are light in weight, the tension applied to the cable 402 may produce a sufficient coupling force for the seismic devices to acquire accurate seismic recordings. The cable or tool may also benefit from the coupling mechanism or weight 404 in providing a faster deployment into the wellbore.

Of course the coupling mechanism or weight 404 will work in deviated wells, but not as well in horizontal or perfectly vertical wells. However, in practical conditions wells are typically not perfectly vertical, so this embodiment applicable to both deviated and vertical wells. Furthermore, besides weight, a packer/clamping mechanism at a bottom or distal end of cable with a winch pull-up force on the cable can be another example of creating cable tension. To create tension in a horizontal well, a tractor or similar movable mechanism know to those in the art may be used to create the desires tension in the cable. As shown in above, weight idea does not work in horizontal well. If it can be describe, "creates cable tension in borehole" could resolve the issues and weight can be one of the example.

The various aspects of the invention were chosen and described in order to best explain principle of the invention and its practical application. The preceding description is intended to enable those of skill in the art to best utilize the invention in various embodiments and aspects and with modifications as are suited to the particular use contemplated. It is intended that the scope of the invention be defined by the following claims.

What is claimed is:

1. A method for deploying at least one seismic device into a borehole, the method comprising:
   winding a cable comprising a plurality of inter-connectable segments onto a rotatable drum;
   unwinding the cable from the rotatable drum and directing the cable to the borehole;
   at a predetermined point, disconnecting a cable segment from the cable before the cable segment descends into the borehole;
   attaching an ellipsoid seismic device between the detached cable segment and an adjacent cable segment; and
   pulling the cable taunt within a borehole casing by attaching a distal end of the cable within the borehole casing such that the distal end of the cable is fixed with respect to the borehole casing and pulling up on the cable within the borehole while the cable is fixed with respect to the borehole casing to move the ellipsoid seismic device into secure contact with the borehole casing.

2. A method for deploying at least one seismic device into a borehole as defined in claim 1, further comprising selecting an ellipsoid seismic sensing unit with exterior physical dimension of at least two row of rows of lateral protrusions extending from a surface of the ellipsoid, an offset of the two rows of lateral protrusions with respect to each other such that at least three of the lateral protrusions contact a lateral interior surface of the borehole.

3. A method for deploying at least one seismic device into a borehole as defined in claim 2, wherein selecting includes selecting the dimension such that at least one protrusion of one of the two rows of protrusions and at least two of the protrusions of the other of the two rows of protrusions contact the interior surface of the borehole.

4. A method for deploying at least one seismic device into a borehole as defined in claim 1, wherein detaching a cable segment and attaching an ellipsoid seismic device comprises a plurality of detaching and attaching steps to connect a plurality of ellipsoid seismic devices to the cable.

5. A method for deploying a plurality of seismic devices into a borehole, the method comprising:
   winding a cable onto a rotatable drum;
   unwinding the cable from the rotatable drum and directing the cable to a borehole;
   at a predetermined point, attaching a seismic device onto the cable before the cable descends into the borehole;
   lowering the seismic device into the borehole; and
   pulling the cable taunt within a borehole casing to force the seismic device laterally into secure contact with a wall of the borehole, the lateral force being applied by attaching a distal end of the cable within the borehole casing such that the distal end of the cable is stationary with respect to the borehole casing and pulling up on the cable within the borehole.

6. A method for deploying a plurality of seismic devices as defined in claim 5 wherein attaching a seismic device includes removably attaching a plurality of seismic devices onto the cable, wherein a first and a second of the plurality of devices defines a single unitary portion of the cable.

7. A method for deploying a plurality of seismic devices as defined in claim 6 further comprising selecting seismic devices having an exterior physical dimension of at least two row of rows of lateral protrusions extending from an exterior surface of the device, an offset of the two rows of lateral protrusions with respect to each other such that at least three of the lateral protrusions contact a lateral interior surface of the borehole.

8. A method for deploying a plurality of seismic devices as defined in claim 7 wherein selecting includes selecting the dimension such that at least one protrusion of one of the two rows of protrusions and at least two of the protrusions of the other of the two rows of protrusions contact the interior surface of the borehole.

9. A method for deploying a plurality of seismic devices as defined in claim 5 wherein attaching the seismic device includes inserting a cable segment having the seismic device between connections disposed in the cable.

10. A method for deploying at least one seismic device into a borehole, the method comprising:
   winding a cable comprising a plurality of inter-connectable segments onto a rotatable drum;
   unwinding the cable from the rotatable drum and directing the cable to a borehole casing;
   at a predetermined point, detaching a cable segment from the cable before the cable segment descends into a borehole;
   positioning three orthogonal seismic sensors within the seismic device;
   providing a plurality of protrusions in two rows on a center portion of an outside surface of the ellipsoid seismic sensor;
   attaching the seismic device between the detached cable segment and an adjacent cable segment; wherein any three adjacent protrusions not in a same row of the plurality of protrusions form a triangle for contact with an internal wall surface of the cylindrical casing; and
   pulling the cable taunt within the borehole casing by attaching a distal end of the cable within the borehole casing such that the distal end of the cable is fixed with respect to the borehole casing and pulling up on the cable within the borehole to establish secure contact between the triangle of protrusions and the internal wall surface.

* * * * *